Sheet 1 - 2 Sheets.

W. Plumer.

Rock-Channeling Mach.

Reissued Apr. 13, 1869.

No. 3,368.

Witnesses,
Joseph Garrett
Ira Sherlin

Inventor;
William Plumer

Sheet 2-2 Sheets.
W. Plumer.
Rock-Channeling Mach.
No. 3,368. Reissued Apr. 13, 1869.
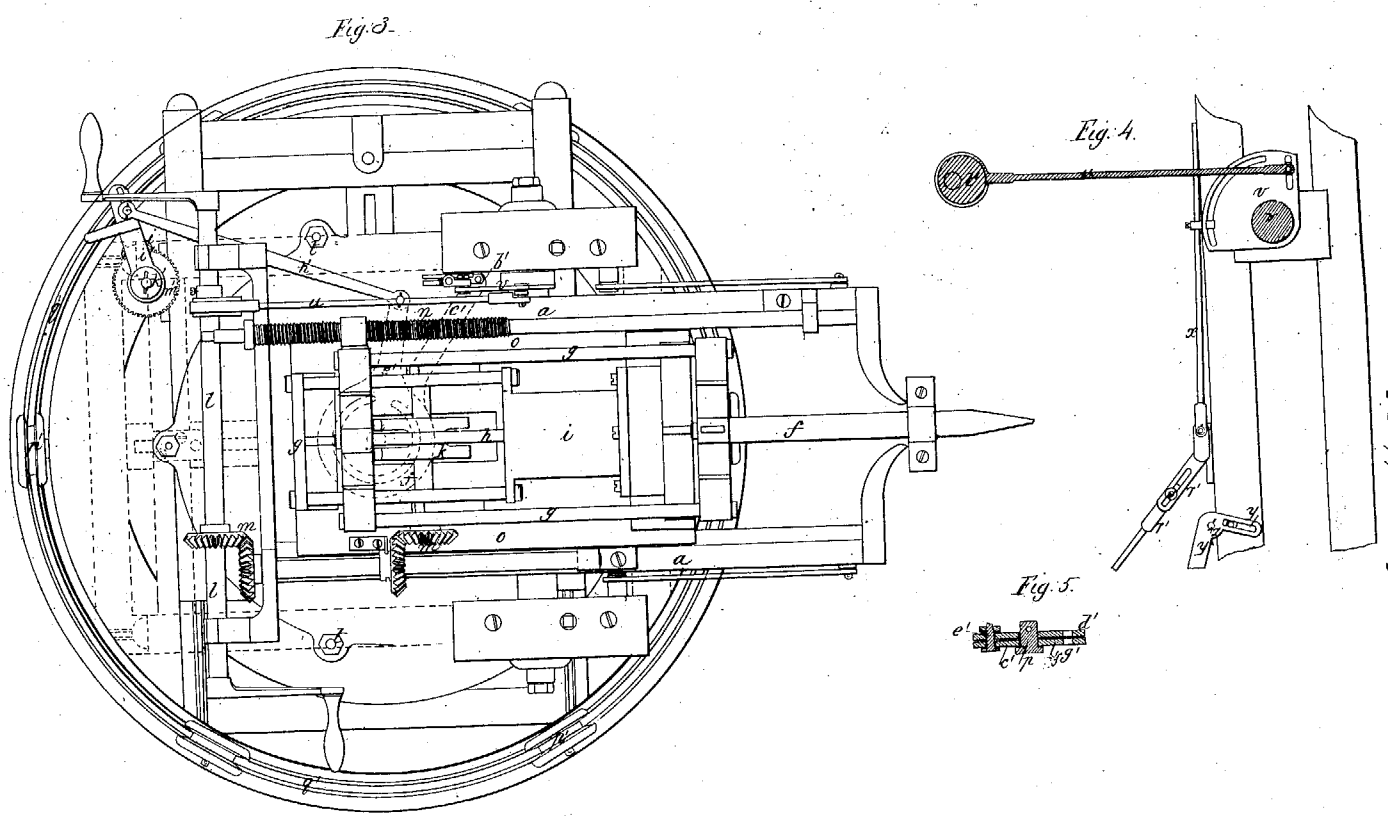
Witnesses;
Joseph Gavell
Ern Sieverts
Inventor;
William Plumer United States Patent Office.

E. G. LAMSON, OF WINDSOR, VERMONT, ASSIGNEE OF WILLIAM PLUMER.

*Letters Patent No.* 18,352, *dated October* 6, 1857; *reissue No.* 3,368, *dated April* 13, 1869.

DIVISION A.

IMPROVED ROCK-CHANNELLING MACHINE.

The Schedule referred to in these Letters Patent and making part of the same.

*To all whom it may concern:*

Be it known that WILLIAM PLUMER, of Boston, in the county of Suffolk, and State of Massachusetts, did invent certain new and useful Improvements in Machines for Cutting and Drilling Rocks, Minerals, &c.; and the following description, taken in connection with the accompanying plate of drawings, hereinafter referred to, forms a full and exact specification of the same, wherein are set forth the nature and principles of the said improvements, by which his invention may be distinguished from others of a similar class, together with such parts as I claim and desire to have secured to me by Letters Patent.

The figures of the accompanying plates of drawings represent his improvements.

Figure 1:
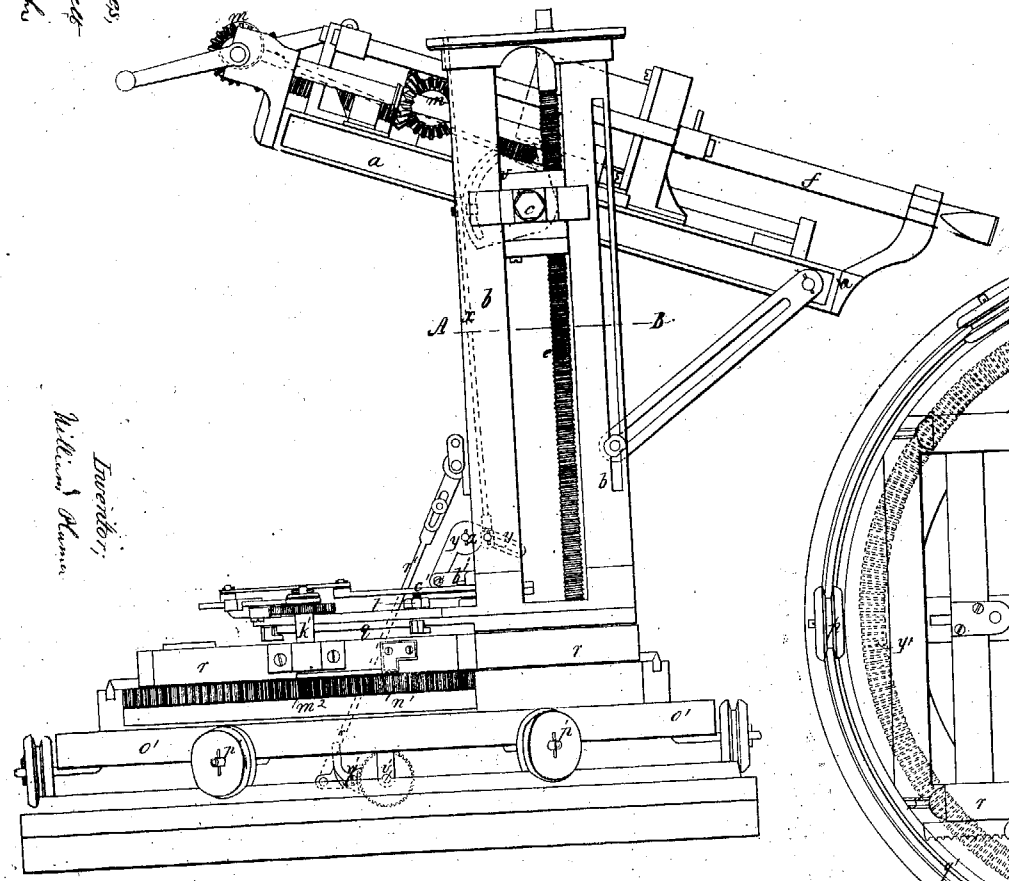

In plate 1, Figure 1, is a side elevation of his improved machine.

Figure 2:
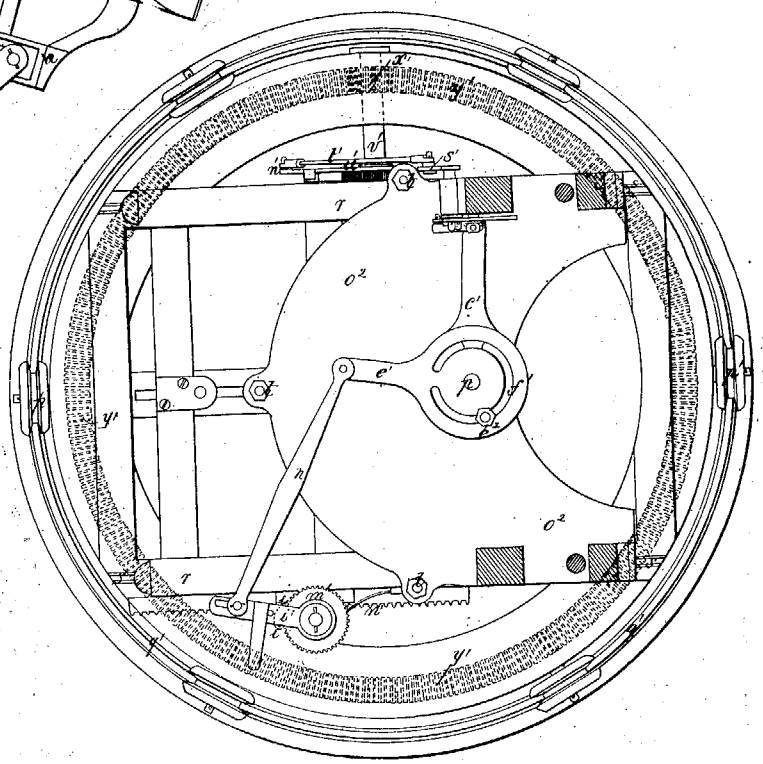

Figure 2 is a horizontal section, taken in the plane of the line A B, fig. 1.

In plate 2, Figure 3, is a plan or top view.

Figures 4 and 5 are detail views, to be hereinafter referred to.

The present invention consists in a new arrangement of devices for cutting and drilling stone, copper, &c., and more particularly for cutting out pillars and blocks of stone, marble, &c., the cutter being operated in such a manner as to work out a circular pillar of any diameter; and also to cut out a square or rectangular, or irregular-shaped block, by working in any or on all sides of the same, or for making straight seams, grooves, or channels.

In the drilling-machines that have previously been invented, the drill could not be fed in the required directions for cutting out a block, or for following seams, but in the present machine the cutter will operate and be fed along as well horizontally at right angles to the cut, as in every other direction.

*a a a*, in the drawings, represent the outer frame, in which the cutting-tool is supported.

This frame turns upon bearings, *c c*, in the standards *b b*, in such a manner that the angle of the cutting-tool can be varied at pleasure, by means of the diagonal braces *d d*, as will be readily understood.

The frame *a a a* is fed up and down by means of the feeding-screws *e e*.

The cutting-tool *f f* is attached to a rectangular frame, *g g*, carrying a piston, *h*, that works in air cylinder *i i*.

The rectangular frame *g g* is actuated by a cam, *k*, that receives motion from the driving-shaft *l l*, through the bevel gears *m m*, &c.

When the piston is drawn up by the cam *k*, a vacuum is produced between it and the head of the air cylinder, so that when the cam is relieved from the end bar of the frame *g g*, the blow will be given to the cutter *f f* by the force of the air acting upon the piston.

The cutter *f f* is fed forward, as the drilling progresses, by means of a feeding-screw, *n*, which carries an inner sliding plate, *o o*, that moves upon the frame *a a a*, and carries the whole drilling-apparatus with it, either forward or back.

I will next proceed to describe the manner in which the cutting-tool is fed along horizontally, and made to operate in a direction at right angles to the cut, which feature is a very important one of his improvements, as I am enabled thereby, in connection with the vertical feeding motions, hereinabove described, and usually employed in drilling-machines to cut out the four sides of a block of stone or marble, and to follow the seams of the same, a result which has never before been attained.

To the standards *b b*, before referred to, is attached a horizontal plate, $o^2$ $o^2$, that turns upon a centre at *p*, and rests upon a base or plate, *q q*, attached to a frame, *r r*, that is fed forward or back upon a track, *s s*, as will be hereinafter explained.

The horizontal plate $o^2$ $o^2$ sustains the standards *b b*, and consequently the whole cutting-apparatus, which can thus be revolved upon the bearing *p* as a centre, and thereby turn the drill or cutter *f f* in a direction at right angles to the track.

Then the track itself and the whole machine is turned at right angles to its former position, so as to bring it parallel to the face of the stone to be cut, either by turning upon a circular track, or by any other desirable means of effecting this object.

The turning plate $o^2$ $o^2$ is held in any desired position by screw-bolts *t t*, &c., that fasten it to the base-plate *q q*.

The frame *r r* is fed along upon the track *s s*, so as to feed the cutter horizontally at right angles to the cut, as follows:

To the driving-shaft *l l* is attached an eccentric, *t'*, fig. 4, which gives motion to the arm *u*, which is secured to the upper end of the slotted quadrant-shaped plate *v*, fig. 4, that turns upon a bearing at *w*.

To the lower end of the quadrant plate *v* is attached a vertical rod, *x*, which receives an up-and-down motion, and actuates the right-angular lever *y y*, fig. 1, that turns upon a fulcrum at *z*, one end of which lever is connected by a pivot-joint at *a'*, to a short horizontal arm, *b'*, fastened to the flat arm *c' d'*, fig. 5.

The circular end, *d'*, of this arm turns upon the bearing *p*, before referred to, as a centre, and has a circular groove formed in it, in which is inserted a screw-bolt, *e'*, fig. 5, which binds the arm *c' d'* to a similar arm, *e' f'*, having a circular groove or slot *g'*.

The motion communicated to the arm *c' d'* will thus, by reason of the two arms being held together by the screw-bolt *e'*, be imparted to the upper arm *e' f'*.

To the arm *e' f'* is attached a connecting-rod, *h'*, which gives a forward and back motion to the horizontal arm $i'$, that turns upon the short vertical shaft $k'$, fig. 1, attached to the frame, before referred to, as a centre, and carries a double pawl, $l'$, that engages with a ratchet-wheel, $m^1$, made fast to the shaft $k'$.

The lower part of the shaft $k'$ has on it a pinion, $m^2$, that travels in a geared rack, $n'$, and thereby feeds the frame $r\ r$, and consequently the whole drilling-apparatus, along in a horizontal direction, and in the direction of the track $s\ s$.

The slotted arms $c'\ d'$ and $e'\ f'$, it will be observed, are so arranged and constructed as to permit the plate $o^2\ o^2$ to be revolved, and thereby the whole cutting-apparatus turned at right angles to the cut, as by loosening the screw-bolt, the arm $e'\ f'$ can travel freely over the arm $c'\ d'$, by reason of the circular slots in the round arms.

By tightening the screw-bolt when the cutting-apparatus is set in the desired position, the arms $e'\ f'$ and $c'\ d'$ are fastened together, whereby the lateral feeding movement is communicated to the whole cutting-apparatus.

The drilling or cutting-tool is fed backward over the track $s\ s$, by simply reversing the double pawl $l'$, as shown by dotted lines in fig. 2.

The facility with which square blocks can be cut out will be apparent, as the side or vertical seams can be cut by feeding the cutter up or down, by means of the feeding-screws $e\ e$, and top and bottom seams by means of the lateral horizontal movement given to the cutter.

From the foregoing description it will be seen that the desired result of feeding the cutter horizontally in a direction at right angles to the cut is obtained by the peculiar arrangement and construction of the feeding-apparatus and the slotted arms for connecting and disconnecting the same, by the use of which arms the plate $o^2\ o^2$, that sustains the whole machine, can be freely turned into the desired position, and the lateral feeding movement, after the said arms are connected, communicated to the cutting-apparatus.

I will next proceed to describe the arrangement of devices by which I am enabled to cut out circular blocks, pillars, &c., of marble or stone, of any diameter, it being just premised that the frame $a\ a\ a$, which sustains the cutting-apparatus, is turned upon its bearings $c\ c$, so that the cutting-tool shall stand in a vertical position.

When the machine is thus employed for cutting columns, &c., the straight track $s\ s$ is firmly attached to a circular frame, $o^1\ o^1$, furnished with grooved wheels $p'\ p'$, &c., that fit over and travel upon a raised circular track, $q'\ q'$, so that the circular frame $o^1\ o^1$, and consequently the whole cutting-apparatus, will turn from a centre, which is the centre of the track $q'\ q'$.

After the cutting-tool, with its frame, &c., has been turned downward into a vertical position, the supporting-frame $r\ r$ is moved forward on its straight track $s\ s$, until the cutting-tool $f\ f$ stands at the required distance from the centre of the track to describe a circle of the desired diameter of the column.

The cutting-tool is then made to travel and cut around this circle, as follows:

The vertical rod $x$, hereinbefore referred to, is disconnected from the right-angular lever $y\ y$, and connected to a bent lever arm, $r'\ r'$, fig. 4, which is connected by means of a pivot, $s'$, passing through the slotted groove of the same to a rod, $t'$, fig. 2, the lower end of which is attached, by a pivot, $n'$, to a short arm, $u'$, which turns upon the short shaft $v'$ as a centre, and carries a pawl, $w'$, that engages with a ratchet-wheel on the shaft $v'$, and gives it an intermittent rotary motion.

On the end of the short shaft $v'$ is a pinion, $x'$, shown by dotted lines in fig. 2, that is thus made to travel around upon the circular-geared rack $y'\ y'$, fig. 2, thereby causing the cutting-tool to be fed as fast as the cutting progresses upon the circumference of the circle.

The diameter of the circle thus cut, of course, can be varied at pleasure by simply feeding the frame $r\ r$, that sustains and carries the whole cutting-mechanism, either forward or back the required distance, as the cutting-tool will, at whatever distance from the centre it may be placed, cut upon a circle, of which the centre of the circular track is the centre, and the distance between the said centre and the point of the cutter, the radius.

Having thus fully described his tinvention,

What I claim as new, and desire to secure by Letters Patent, is—

1. Feeding the cutter laterally in a direction at right angles to the cut, or nearly so, whether the cutting-tool be situated horizontally, vertically, or at any angle, by the devices herein described, or their equivalents, so arranged that the cutter or drill can be turned at right angles to the straight track of the machine, and also the requisite feeding motion be obtained, as set forth.

2. The slotted arms $c'\ d'$ and $e'\ f'$, so arranged and constructed as to permit the whole cutting-apparatus to be turned at right angles to the cut, and to communicate, when fastened together, the lateral feeding motion to the frame $r\ r$.

3. The arrangement of devices herein described, whereby I am enabled to feed the cutter, working vertically, in a circular direction, and set the cutter at any desired distance from the centre upon which the machine turns, by which blocks or pillars of any desired diameter can be cut out, as set forth.

4. A stone-cutting or channelling-machine, which moves upon a straight track, mounted upon a circular track, the standards supporting the drill or drills resting upon a turning plate, all so constructed that the drill or drills may be operated on either side of the straight track in circular lines, or fed forward in parallel lines, substantially as set forth.

5. The arrangement, under a stone-drilling machine, substantially as herein set forth, of flanged rollers for keeping the frame and mechanism in place upon the track, substantially as specified.

In testimony that I claim the foregoing, I have hereunto set my hand, this 18th day of March, 1869.

E. G. LAMSON.

Witnesses:

JNO. O. GOODRICH,

J. M. MASON.